United States Patent [19]

Seko et al.

[11] Patent Number: 4,518,954

[45] Date of Patent: May 21, 1985

[54] DOZING WARNING DEVICE FOR A VEHICLE

[75] Inventors: Yasutoshi Seko, Yokohama; Takayuki Yanagishima, Yokosuka, both of Japan

[73] Assignee: Nissan Motor Company, Limited, Kanagawa, Japan

[21] Appl. No.: 377,268

[22] PCT Filed: Sep. 21, 1981

[86] PCT No.: PCT/JP81/00246

§ 371 Date: May 6, 1982

§ 102(e) Date: May 6, 1982

[87] PCT Pub. No.: WO82/00979

PCT Pub. Date: Apr. 1, 1982

[30] Foreign Application Priority Data

Sep. 22, 1980 [JP] Japan .................................. 55-132059

[51] Int. Cl.³ .............................................. G08B 21/00
[52] U.S. Cl. ...................................... 340/576; 180/272
[58] Field of Search ............. 340/575, 576, 573, 52 R, 340/52 D, 53; 180/272; 128/719

[56] References Cited

U.S. PATENT DOCUMENTS 3,877,541  4/1975  Takeuchi et al. .................. 180/272
3,980,999  9/1976  Nishioka et al. .................. 340/52 R
4,007,357  2/1977  Yanagishima ..................... 340/52 R Primary Examiner—Glen R. Swann, III
Attorney, Agent, or Firm—Lowe, King, Price & Becker

[57] ABSTRACT

A warning device detects abrupt steering when the driver is dozing at the wheel and recognizes dozing of the driver to give a warning. The warning device comprises a sensor 20 for detecting steering variation angle, circuit 120, 130 for detecting abrupt steering based on detected right- and left-hand steering angle variations, and circuits 142, 146 for operating a warning means 30 when abrupt steering to the left and abrupt steering to the right are consecutively detected within a given period.

17 Claims, 7 Drawing Figures

DOZING WARNING DEVICE FOR A VEHICLE

FIELD OF THE INVENTION

The present invention relates generally to a warning device for detecting when a driver is dozing at the wheel and for producing a warning in response thereto. More particularly, the invention relates to a warning device which detects abnormal steering operations occurring when the driver dozes at the wheel of an automotive vehicle.

BACKGROUND OF THE INVENTION

With regard to automotive vehicles, certain driving operations different from those of normal driving occur when the driver dozes. For example, with a dozing driver, certain abnormal operations, such as steering frequency being maintained at a significantly low level or no steering operation for a certain period of time and thereafter abrupt steering, may be performed. Normally, due to inattention of the dozing driver, steering frequency is unnecessarily increased. Therefore, if specific steering operations apt to occur during dozing at the wheel can be detected, it is possible to detect when the driver is dozing at the wheel. By accurately detecting dozing of the driver, an appropriate warning can be given to awaken the driver from the dozing state.

On the other hand, even under the normal driving conditions, it is occasionally necessary to steer similarly to the specific operations occurring during dozing at the wheel, depending on road conditions. Therefore, there is some possibility of producing a warning erroneously due to improper recognition of dozing. For example, when the vehicle passes from a straight road to a relatively narrow curved road, the steering operation frequency will be relatively low while driving on the straight stretch and thereafter steering operations of relatively high frequency and amplitude will be performed while on the curved road. Thus, if recognition of driver dozing is based on the condition that steering frequency less than a predetermined frequency is maintained for more than a predetermined time period and thereafter abrupt steering is performed, the warning will be given in the above driving condition even through the driver is in a normal conscious state. Therefore, for detecting dozing of the driver, it is quite important to select warning conditions which are quite specific to the dozing state.

According to the present invention, considering the fact that abrupt steering in alternating directions is apt to occur during dozing at the wheel and such steering operations are not likely to occur during normal driving, these conditions should be suitable for dozing detection. That is, according to the present invention, the state in which the driver is dozing at wheel is detected when steering operations in alternating directions each exceeding a predetermined steering angle, e.g., 15°–40°, are performed within a given period of time. This way, dozing can be detected accurately and malfunction of the warning system can be effectively prevented.

Therefore, it is an object of the present invention to provide a warning device which properly detects dozing of the driver on the basis of steering operating conditions to prevent the warning system from malfunctioning and to ensure detection of dozing in order to give warning.

A more specific object of the invention is to provide a warning device in which consecutive abrupt steering changes in opposite directions are detected and a warning is produced in response thereto.

Another object of the present invention is to provide a warning method detecting abnormal steering operations to accurately detect dozing of the driver and giving warning based on the result of detection.

SUMMARY OF THE INVENTION

To accomplish the above-mentioned object, a warning device according to the present invention has means for producing a warning signal when abrupt steering operations are performed consecutively in alternating directions. Accordingly, since the detection is made when steering in opposite directions is consecutively performed, detection is accurate and therefore the malfunction of giving warning under normal driving conditions is effectively prevented.

To accomplish another object, according to the invention, a normal steering operation frequency is preset. When the steering operation frequency exceeds the normal frequency, the period in which abnormally frequent steering operations continue is measured and when abrupt steering operation exceeding a predetermined steering angle are performed in alternative directions, the detection that the driver is dozing is made. According to this criterion, since such steering operation will not occur in the normal driving condition, distinction between normal and abnormal driving condition is quite accurate.

DESCRIPTION OF THE PREFERRED EMBODIMENTS

Figure 1:
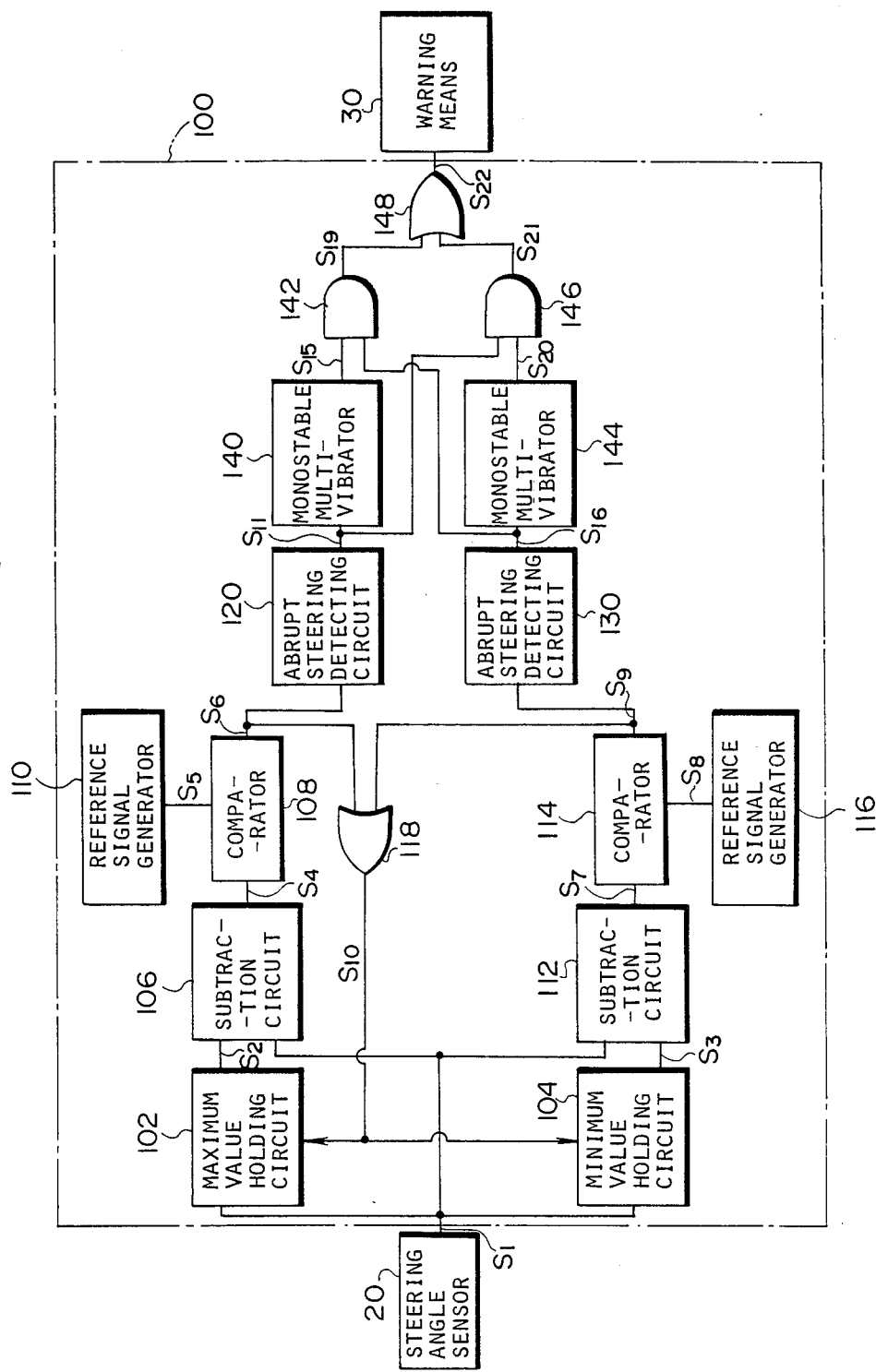
FIG. 1 is a block diagram of a preferred embodiment of a dozing warning device of the present invention.

The preferred embodiment of the present invention will be described herebelow with reference to the accompanying drawings. FIG. 1 shows a block diagram of the preferred embodiment of the dozing warning device of the invention, in which a steering angle sensor 20 continuously monitors steering angle corresponding to rotational operation of a steering wheel (not shown). The steering angle sensor 20 sequentially produces a sensor signal $S_1$ having variable value corresponding to variations in the steering angle. For example, the steering angle sensor may comprise a variable resistor attenuating a signal value proportionally with respect to the angular position of the steering column (not shown), or a signal generator which produces a pulse in response to a predetermined change in steering angle and a counter for counting the pulses and producing a signal having a value proportional to the counted value. In brief, the steering angle sensor may comprise any appropriate device.

The sensor signal $S_1$ from the steering angle sensor 20 is inputted to a dozing detecting circuit 100. The dozing detecting circuit 100 has a maximum value holding circuit 102 for holding the maximum value of the sensor signal $S_1$ and a minimum value holding circuit 104 for holding the minimum value of the sensor signal. The maximum value holding circuit 102 is continuously updated by the sensor signal $S_1$ and produces a maximum value signal $S_2$ representative of the value held therein. Similar to the maximum value holding circuit 102, the minimum value holding circuit 104 is regularly updated by the sensor signal $S_1$ and produces a minimum value signal $S_3$ representative of the value held therein. The maximum value signal $S_2$ from the maximum value holding circuit 102 is inputted to one of the input terminals of a subtraction circuit 106. To the other input terminal of the subtraction circuit 106, the steering angle sensor 20 is directly connected to continuously input the sensor signal $S_1$. The subtraction circuit 106 performs a subtraction operation to obtain the difference between the signal values of the sensor signal $S_1$ and the maximum value signal $S_2$. The subtraction circuit 106 continuously outputs an output $S_4$ representative of the obtained signal value difference. The output $S_4$ of the subtraction circuit 106 is inputted to a comparator 108. The comparator 108 is connected to a reference signal generator 110 which produces a reference signal $S_5$ having a predetermined constant value. The comparator 108 compares the values of the output $S_4$ of the subtraction circuit and the reference signal $S_5$ to produce an output $S_6$ when the value of output $S_4$ equal to or greater than that of the reference signal $S_5$.

Similarly, the minimum value signal $S_3$ of the minimum value holding circuit 104 is inputted to a subtraction circuit 112. The subtraction circuit 112 receives the sensor signal $S_1$ of the steering angle sensor 20 similar to the aforementioned subtraction circuit 106. The subtraction circuit 112 performs a subtraction operation to obtain the difference between the signal values of the minimum value signal $S_3$ and the sensor signal $S_1$ to produce an output $S_7$ representative of the obtained difference. The output $S_7$ of the subtraction circuit 112 is fed to a comparator 114 to be compared with a reference signal $S_8$ fed from a reference signal generator 116. The comparator 114 produces an output $S_9$ when the value of the output $S_7$ is equal to or greater than that of the reference signal $S_8$.

It should be noted that the comparators 108 and 114 are both adapted to produce pulse-form outputs whenever the output values of the subtraction circuits 106 and 112 exceed the corresponding reference values.

The outputs $S_6$ and $S_9$ of the comparators 108 and 114 are inputted to an OR gate 118. The OR gate 118 produces a gate output $S_{10}$ whenever either or both of the outputs $S_6$ and $S_9$ of the comparators 108 and 114 is inputted. The gate output $S_{10}$ serves as a reset signal for the foregoing maximum value holding circuit 102 and the minimum value holding circuit 104. The gate output $S_{10}$ is inputted to the maximum value holding circuit 102 and the minimum value holding circuit 104 to clear the values held therein and to replace the values held therein with the value of the sensor signal $S_1$.

Figure 3A:
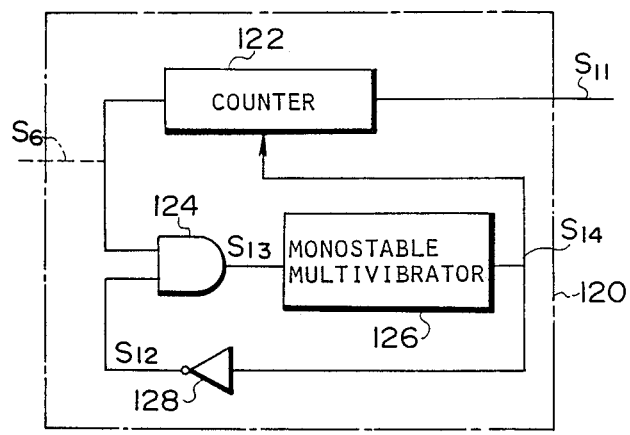
FIGS. 3A and 3B are block diagrams of examples of abrupt steering detection circuits.

The output $S_6$ of the comparator 108 is inputted to an abrupt steering detecting circuit 120 simultaneously with being inputted to the OR gate 118. As shown in FIG. 3A, the abrupt steering detecting circuit 120 comprises a counter 122, an AND gate 124, a monostable multivibrator 126 and an inverter 128. The counter 122 counts the output pulses $S_6$ of the comparator 108 to produce an abrupt steering signal $S_{11}$ when the counter value reaches a predetermined value. In addition, the output $S_6$ of the comparator 108 is inputted to the AND gate 124. The AND gate 124 receives high level signal $S_{12}$ via the inverter 128 when the monostable multivibrator 126 is maintained OFF. The AND gate 124 produces a gate output $S_{13}$ in response to the comparator output $S_6$ only in conjunction with a high-level signal $S_{12}$. The monostable multivibrator 126 is turned on in response to the gate output $S_{13}$ to output a high-level signal $S_{14}$ for a given period of time. The output $S_{14}$ of the monostable multivibrator 126 is inputted to the counter 122 to make the counter operative. That is, the counter 122 counts the comparator output pulses $S_6$ during the period in which the monostable multivibrator 126 outputs the high-level signal $S_{14}$. When the high-level signal $S_{14}$ of the monostable multivibrator 126 is inputted to the inverter 128, the output $S_{12}$ of the inverter goes to a low level. Thereby, the AND gate 124 becomes inoperative and remains inoperative as long as the high-level signal $S_{14}$ from the monostable multivibrator 126 is present. The abrupt steering signal $S_{11}$ of the counter of abrupt steering detecting circuit 120 is inputted to a monostable multivibrator 140 to turn the latter ON for a predetermined period of time. The monostable multivibrator 140 produces an output $S_{15}$ while it remains ON. The output $S_{15}$ of the monostable multivibrator 140 is fed to one of the input terminals of an AND gate 142. The other input terminal of the AND gate 142 is connected to an abrupt steering detecting circuit 130. The AND gate 142 produces an output in response to an abrupt steering signal $S_{16}$ from the abrupt steering detecting circuit 130 only in conjunction with the output $S_{15}$ of the monostable multivibrator 140.

Figure 3B:
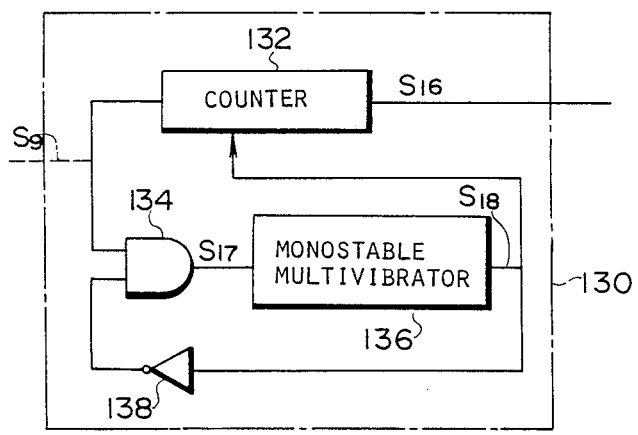

Identically to the aforementioned abrupt steering detecting circuit 120, the abrupt steering detecting circuit 130 comprises a counter 132, an AND gate 134, a monostable multivibrator 136 and an inverter 138, as shown in FIG. 3B. The AND gate 134 produces a gate output $S_{17}$ when the monostable multivibrator 136 is OFF and the output $S_9$ of the comparator 114 is received. The monostable multivibrator 136 is responsive to the gate output $S_{17}$ to turn ON to produce an output $S_{18}$ for a predetermined period of time. The counter 132 becomes operative while the output $S_{18}$ of the monostable multivibrator 136 is outputted. The counter 132 counts the output pulses $S_9$ fed from the comparator 114 while it is operative. The counter 132 produces an abrupt steering signal $S_{16}$ when the counter value reaches a predetermined value. In addition, the output $S_{18}$ of the monostable multivibrator 136 is inverted by the inverter 138 and then inputted to the AND gate 134 to make the latter inoperative.

The abrupt steering signal $S_{16}$ from the counter 132 of the abrupt steering detecting circuit 130 is inputted to the AND gate 142 together with the output $S_{15}$ of the monostable multivibrator 140 to produce a gate output $S_{19}$. At the same time, the abrupt steering signal $S_{16}$ is inputted to a monostable multivibrator 144. The monostable multivibrator 144 is responsive to the abrupt steering signal $S_{16}$ to produce an output $S_{20}$. The output $S_{20}$ of the monostable multivibrator 144 is inputted to one of the input terminals of an AND gate 146. The other input terminal of the AND gate 146 receives the abrupt steering signal $S_{11}$ of the abrupt steering detecting circuit 120. The AND gate 146 produces a gate output $S_{21}$ when both the output $S_{20}$ of the monostable multivibrator 144 and the abrupt steering signal $S_{11}$ from the abrupt steering detecting circuit 120 are received.

An OR gate 148 is responsive to the gate output $S_{19}$ of the AND gate 142 and/or the gate output $S_{21}$ of the AND gate 146 to produce an output $S_{22}$. The output $S_{22}$ serves as a warning signal for activating a warning means 30 for producing a warning. Warning means 30 can be any of many existing devices, such as a means for producing visible warnings such as a lamp or display, a means for giving an audible warning such as buzzer, warning voice or any other appropriate means for waking the driver.

Figure 2:
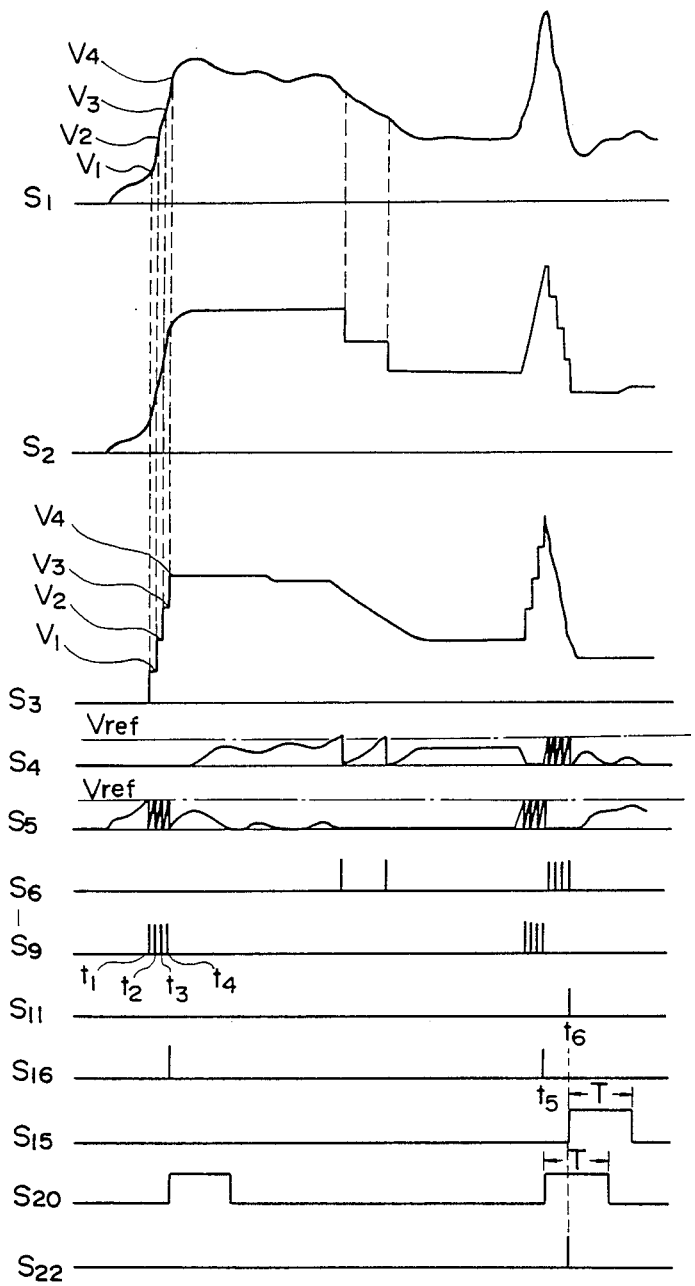
FIG. 2 is a timechart for the dozing warning device of FIG. 1.

The operation of the above-described device will be illustrated herebelow with reference to the timing chart of FIG. 2. The sensor signal $S_1$ from the steering angle sensor 20 is inputted to the maximum value holding circuit 102 and the minimum value holding circuit 104. The maximum value holding circuit 102 and the minimum value holding circuit 104 are updated by the sensor signal when the gate output $S_{10}$ of the OR gate 118 is produced in response to the outputs $S_6$ and/or $S_9$ of the comparators 108 and 114. When updating is indicated by the gate output $S_{10}$, the maximum value holding circuit 102 and the minimum value holding circuit 104 replace the held values thereof with the sensor signal value. That is, in FIG. 2, at times $t_1$, $t_2$, $t_3$ and $t_4$, the difference $S_7$ between the held value $S_3$ of the minimum value holding circuit 104 and the value of the sensor signal $S_1$ becomes equal to or greater than the reference signal $S_8$ and, thus, the comparator 114 produces the output $S_9$. The OR gate 118 produces the gate output $S_{10}$ whenever it receives the comparator output $S_9$. In turn, the held values of the maximum value holding circuit 102 and the minimum value holding value holding circuit 104 are cleared. At this time since the sensor signal value is increasing, the held value of the maximum value holding circuit 102 is replaced with the value of the sensor signal $S_1$ after being cleared. On the other hand, the minimum value holding circuit 104 holds signal values $v_1$, $v_2$, $v_3$ and $v_4$ as minimum values at times $t_1$, $t_2$, $t_3$ and $t_4$ at which the held value is updated.

The maximum value holding circuit 102 and the minimum value holding circuit 104 produce the maximum value signal $S_2$ and the minimum value signal $S_3$ respectively representative of the held values thereof and feed them to respective subtraction circuits 106 and 112. The subtraction circuits 106 and 112 calculate the differences between the value of sensor signal $S_1$ and the values of maximum value signal $S_2$ and minimum value signal $S_3$ to produce outputs $S_4$ and $S_7$ respectively representative of the obtained differences. The values of the outputs $S_4$ and $S_7$ are compared with the value $V_{ref}$ of the reference signals $S_5$ and $S_8$ by the comparators 108 and 114. The comparators 108 and 114 produce outputs $S_6$ and $S_9$ when the values of the subtraction circuit outputs $S_4$ and $S_7$ respectively exceed the reference value $V_{ref}$. The comparator outputs $S_6$ and $S_9$ are respectively inputted to the abrupt steering detecting circuits 120 and 130.

The abrupt steering detecting circuits 120 and 130 count the pulses of the comparator outputs $S_6$ and $S_9$ within a predetermined fixed period defined by the monostable multivibrators 126 and 136 respectively. The counters 122 and 132 produce the outputs $S_{11}$ and $S_{16}$ when the counter values thereof exceed the predetermined value. In response to the counter outputs $S_{11}$ and $S_{16}$, the monostable multivibrators 140 and 144 turn ON for a constant period of time T to input the outputs $S_{15}$ and $S_{20}$ respectively to the AND gates 142 and 146.

In FIG. 2, the counter 132 of the abrupt steering detecting circuit 130 outputs the output $S_{16}$ at the time $t_5$. Thus, the monostable multivibrator 144 turns on at the time $t_5$ for the constant period of time T. At the time $t_6$ which is within the period T of time $t_5$, the counter 122 of the abrupt steering detecting circuit 120 outputs the output $S_{11}$. Both of the signals $S_{11}$ and $S_{20}$ are received by the AND gate 146 to produce gate output $S_{21}$. Thus, the OR gate 148 produces the warning signal $S_{22}$ to activate the warning means to give warning.

Figure 4:
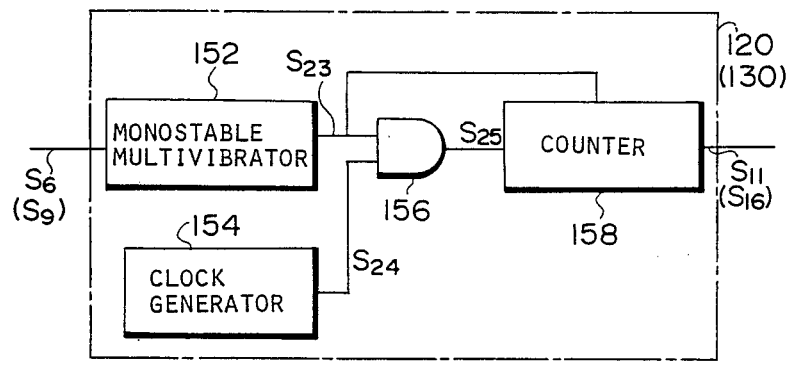
FIGS. 4 and 5 are block diagrams of other modifications of the abrupt steering detection circuit.

FIG. 4 is another embodiment of the abrupt steering detecting circuits 120, 130 of FIG. 1. The abrupt steering detecting circuit of this embodiment comprises a monostable multivibrator 152 responsive to the comparator outputs $S_6$ or $S_9$ to turn ON to produce an output $S_{23}$ for a given period of time, a clock generator 154 for producing clock pulses $S_{24}$, an AND gate 156 for producing an output $S_{25}$ when the AND condition of the outputs $S_{23}$ and $S_{24}$ is established and a counter 158 which counts the pulses $S_{25}$ from the AND gate 156 and outputs either the outputs $S_{11}$ or the output $S_{16}$ respectively when the counter value reaches a predetermined value. The counter 158 is reset by the falling edge of the output $S_{23}$ of the monostable multivibrator 152 when the latter turns OFF. In this embodiment, if the comparator outputs $S_6$ or $S_9$ are reinputted when the monostable 152 is already ON, the measurement of the predetermined period is renewed and therefore the ON period of the monostable multivibrator 152 is prolonged. The total length of the prolonged period is measured by the clock pulse count.

Figure 5:
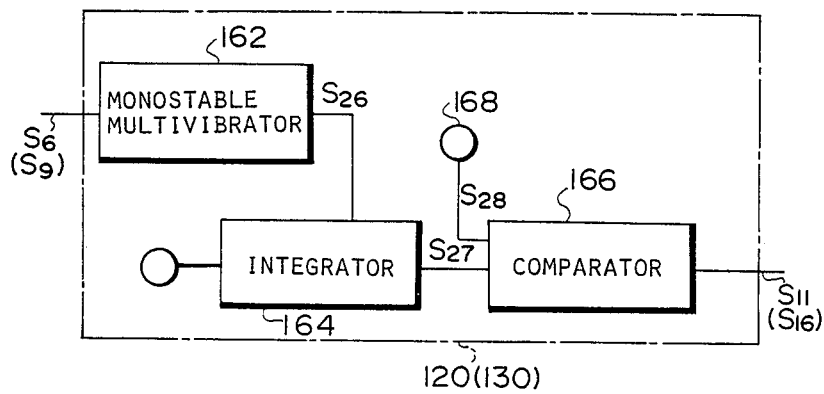

FIG. 5 shows a further embodiment of the abrupt steering detecting circuit of FIG. 1. The abrupt steering detecting circuit of this embodiment comprises a monostable multivibrator 162, an integrator 164 and a comparator 166. The monostable multivibrator 162 is responsive to the output $S_6$ ($S_9$) of the comparator 108 (114) to turn ON for a predetermined period of time to produce an output $S_{26}$. The output $S_{26}$ of the monostable multivibrator 162 is integrated by the integrator 164. The result of integration is fed to the comparator 166 as integrator output $S_{27}$. The comparator 166 compares the integrator output $S_{27}$ with a reference signal $S_{28}$ fed from a reference signal generator 168. The comparator 166 produces the output $S_{11}$ ($S_{16}$) when the integrator output $S_{27}$ exceeds the reference signal $S_{28}$.

Figure 6:
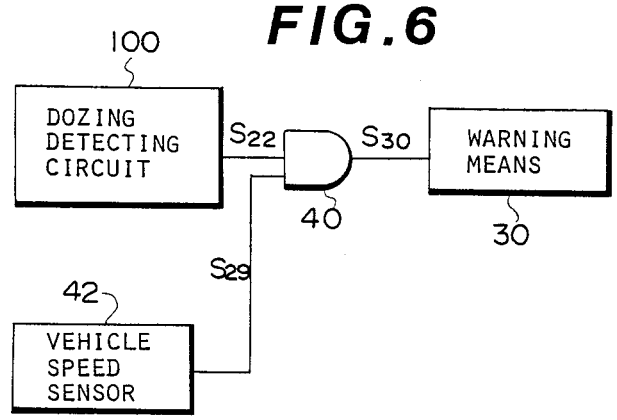
FIG. 6 is block diagram of another embodiment of the dozing warning device of the invention.

It should be noted that the dozing warning device of the present invention can be embodied in various ways other than as described. Also, the embodiments given hereabove can be modified in many ways. For example, it is possible to add other warning conditions. FIG. 6 shows a modification of the embodiment of FIG. 1, in which vehicle speed is used as an additional warning condition. In this modification, the dozing detecting circuit 100 is connected to the warning means 30 via an AND gate 40. The other input terminal of the AND gate 40 is connected to a vehicle speed sensor 42. The vehicle speed sensor 42 detects the vehicle speed and produces a vehicle speed signal $S_{29}$ when the detected vehicle speed is higher than a given speed. The AND gate 40 produces an output when the AND condition of the vehicle speed signal $S_{29}$ of the vehicle speed sensor 42 and the warning signal $S_{22}$ of the dozing detecting circuit 100 is established, to operate the warning means.

As explained hereabove, the present invention fulfills all of the objects sought therefor.

What is claimed is:

1. A dozing warning device comprising:

steering angle detecting means for producing a signal $S_1$ representative of variations in the steering angular position;

first and second abrupt steering detecting means for producing first and second abrupt steering pulses $S_{11}$, $S_{16}$ respectively when the value of an increase of the signal $S_1$ exceeds a value representative of a predetermined angle variation or when the value of the decrease of the signal $S_1$ exceeds said value, respectively;

means for producing a warning signal $S_{22}$ when both of said abrupt steering pulses $S_{11}$ and $S_{16}$ are produced within a predetermined period of time T; and warning means for producing a warning in response to said warning signal $S_{22}$.

2. A dozing warning device comprising:

a steering angle detecting means for producing a signal $S_1$ having a value variable in first and second directions according to variations in the steering angular position;

first abrupt steering detecting means for producing a first abrupt steering pulse $S_{11}$ when change in the steering angel in the first direction exceeds a predetermined angle;

second abrupt steering detecting means 130 for producing second abrupt steering pulse $S_{16}$ when change in the steering angle in the second direction exceeds the predetermined angle;

means for producing a warning signal $S_{22}$ when said first and second abrupt steering pulses $S_{11}$ and $S_{16}$ are both produced within a predetermined period of time T; and warning means for producing a warning in response to said warning signal $S_{22}$.

3. A device as set forth in claim 1 or 2, further comprising circuit means for producing first and second steering angle variation pulses $S_6$ and $S_9$ when the change of the value of the signal $S_1$ indicative of the steering angle variation exceeds first and second given values, said first and second abrupt steering detecting means including counters for counting the steering angle variation pulses to produce said first and second abrupt steering pulses $S_{11}$ and $S_{16}$ respectively when the counter values exceed a predetermined value.

4. A device as set forth in claim 3, wherein said circuit means for producing said first and second steering angle variation pulses $S_6$, $S_9$ comprise holding circuits respectively for storing maximum and minimum values of the signal $S_1$ indicative of variation in the steering angle variation, and comparator means for comparing the stored value in said holding circuits and the current signal value of the steering angle signal $S_1$ to produce said steering angle variation pulses $S_6$ and $S_9$ when the difference between the current value of the steering signal and the maximum and minimum values thereof, respectively, exceeds a predetermined value and to reset the values stored in said holding circuits.

5. A device as set forth in claim 3, wherein said first and second abrupt steering detecting means further includes respective time determining circuits for providing a preset time for said respective counters to attain values exceeding said predetermined value, and means connecting said time determining circuits to said respective counters for resetting said counters upon expiration of said preset period.

6. A device as set forth in claim 1 or 2, wherein each of said abrupt steering detecting means comprises a time setting means for renewably setting a preset period of time whenever the variation of the steering angular position in one direction exceeds a predetermined value, and means for producing the abrupt steering pulse $S_{11}$, $S_{16}$ respectively when the length of the renewed period of time exceeds a predetermined period.

7. A device as set forth in claim 1 or 2, further comprising inputting means for inputting said warning signal $S_{22}$ to said warning means when a vehicle speed is higher than a predetermined speed, said inputting means interposed between said means for producing said warning signal and the warning means.

8. A method for warning a dozing driver, comprising the steps of:

(a) detecting steering angle variation in first and second directions;

(b) comparing the detected steering angle variation with a predetermined value;

(c) measuring an interval between times when the steering angle variation in the first direction exceeds a predetermined value and the steering angle variation in the second direction exceeds the predetermined value;

(d) comparing the measured interval with a predetermined interval; and (e) producing a warning when the measured interval is shorter than the predetermined interval.

9. A method as set forth in claim 8, which further comprises the steps of detecting a vehicle speed exceeding a predetermined speed, and producing the warning when the vehicle speed is higher than the predetermined speed and the steering angle variations in both of said first and second directions exceeds the predetermined value within the predetermined interval.

10. A dozing warning device comprising:

a steering angle detecting means for detecting variation of steering angular position and producing a steering angle signal having a value increasing according to steering angle variation in a first direction and decreasing according to steering angle varation in a second direction;

first abrupt steering detecting means for producing a first abrupt steering indicating signal when the value of said steering angle signal is increased beyond a given first threshold;

second abrupt steering detecting means for producing a second abrupt steering indicating signal when the value of said steering angle signal is decreased to less than a given second threshold;

a warning signal generator means responsive to said first and second abrupt steering indicating signals to produce a warning signal when one of said first and second abrupt steering indicating signals is produced within a given period of time after the other of said abrupt steering indicating signals is produced; and a warning means for producing a warning in response to said warning signal.

11. A device as set forth in claim 10, further comprising respective comparator means for comparing the signal value of said steering angle signal with respective predetermined reference values to produce respective comparator signals when said steering angle signal value is larger or less than said predetermined reference values, and means for renewing said predetermined reference values, whenever the comparator signal is produced, as a sum of the value of said steering angle signal at the time said comparator signal is produced and a predetermined base value, and a counter counting at least one of said comparator signals to produce a corresponding one of first and second abrupt steering indicating signals when the counter count reaches one of said first and second thresholds.

12. A device as set forth in claim 11, wherein each of said first and second abrupt steering detecting means further comprises timing means connected to said respective comparator for establishing respective preset time periods beginning responsively to said comparator signal.

13. A device as set forth in claim 12, wherein each of said first and second abrupt steering detecting means further comprises a time setting means for renewing said preset period of time whenever the variations of the value of said steering angle signal exceeds said predetermined reference value, and means for producing said corresponding one of said first and second abrupt steering indicating signals when the renewed period exceeds a predetermined period.

14. A device as set forth in claim 13, which further comprises means for establishing and blocking communication between said warning signal generator means and said warning means, said means for establishing and blocking being responsive to a vehicle speed higher than a given speed to establish communication therebetween and to feed said warning signal to said warning means.

15. A device as set forth in claim 13, further comprising means for measuring said renewed preset period connected to said means for producing said abrupt steering indicating signals for generating said abrupt steering indicating signals when said means for measuring measures said renewed preset period to be in excess of said predetermined period.

16. A device as set forth in claim 12, further comprising means connecting said counter to be reset by an output signal of said timing means indicative of termination of said preset time period for producing said first or second abrupt steering indicating signals only if said counter in said first or second abrupt steering detecting means reaches said first or second threshold within the respective preset time period therefor.

17. A device as set forth in claim 10, further comprising respective comparator means for comparing the signal value of said steering angle signal with respective predetermined reference values to produce respective comparator signals when said steering angle signal value is larger or less than said predetermined reference values, and means for renewing said predetermined reference values, whenever the comparator signal is produced, as a sum of the value of said steering angle signal at the time said comparator signal is produced and a predetermined base value wherein each of said first and second abrupt steering detecting means further comprises timing means connected to said respective comparator for establishing respective preset time periods beginning responsively to said comparator signal, and a time setting means for renewing said preset period of time whenever the variation of the value of said steering angle signal exceeds said predetermined reference value, and means for producing said corresponding one of said first and second abrupt steering indicating signals when the renewed period exceeds a predetermined period.

* * * * *